United States Patent [19]

Odajima et al.

[11] Patent Number: 4,722,360
[45] Date of Patent: Feb. 2, 1988

[54] FLUID REGULATOR

[75] Inventors: Katsuhiko Odajima; Motoshige Ikehata, both of Sohka, Japan

[73] Assignee: Shoketsu Kinzoku Kogyo Kabushiki Kaisha, Tokyo, Japan

[21] Appl. No.: 819,705

[22] Filed: Jan. 17, 1986

[30] Foreign Application Priority Data

Jan. 26, 1985 [JP] Japan .................................. 60-13060

[51] Int. Cl.⁴ ........................................... F16K 31/126
[52] U.S. Cl. ................................ 137/487.5; 137/489; 137/85; 251/30.01
[58] Field of Search ...................... 137/489, 487.5, 85; 251/30.01

[56] References Cited

U.S. PATENT DOCUMENTS

| | | | |
|---|---|---|---|
| 2,964,051 | 12/1960 | Garpett | 137/85 |
| 4,481,967 | 11/1984 | Frick | 137/487.5 X |
| 4,524,906 | 6/1985 | Kenyon et al. | 251/30.01 X |
| 4,572,234 | 2/1986 | Schwelm | 137/489 |

FOREIGN PATENT DOCUMENTS

| 565888 | 11/1923 | France | 137/489 |
|---|---|---|---|
| 125951 | 4/1959 | U.S.S.R. | 137/85 |

Primary Examiner—Arnold Rosenthal
Attorney, Agent, or Firm—Burns, Doane, Swecker & Mathis

[57] ABSTRACT

A fluid regulator including, in a housing, a nozzle flapper mechanism, a diaphragm displaceable by the nozzle back pressure of the nozzle flapper mechanism, a valve body for controlling fluid communication through a fluid passage in accordance with displacement of the diaphragm, and a sensor for picking up a change in output fluid pressure from the fluid passage as a change in an electric signal. The nozzle flapper mechanism includes an electrostrictive element positioned closely to the nozzle of the nozzle flapper mechanism. Displacement of the electrostrictive element with respect to the nozzle is controlled by a differential signal resulting from comparison between an electric input signal and an electric signal from the sensor. The nozzle back pressure is varied dependent on the displacement of the electrostrictive element for thereby displacing a valve body in the fluid passage until the valve body is brought into equilibrium.

4 Claims, 3 Drawing Figures

FLUID REGULATOR

BACKGROUND OF THE INVENTION

The present invention relates to a fluid regulator, and more particularly to a fluid regulator of the non-bleed type in which no fluid pressure should be released to atmosphere, such as a fluid regulator capable of regulating the pressure of a fluid such as an oxygen gas in proportion to an electric signal applied and producing the regulated fluid pressure as an output pressure.

Fluid regulators comprising an electropneumatic transducer and a pressure converter in combination have widely been used heretofore for regulating a fluid output pressure to a constant level through the use of an electric signal. One such conventional fluid regulator is shown in FIGS. 1 and 2 of the accompanying drawings.

As illustrated in FIG. 1, an electropneumatic transducer 2 for converting an electric signal to a pneumatic pressure signal has an output connected to a first port 6 of a pressure converter 4 having a diaphragm 8 housed therein. The pressure converter 4 also has a regulator valve 10 having one end held against the diaphragm 8 and the opposite end positioned in a valve hole 15 defined between a second port 12 serving as a pressure supply port and a third port 14 serving as a pressure outlet port for producing an output fluid pressure. Therefore, the pressure converter 4 is of the non-bleed type in which no pneumatic pressure is relieved to atmosphere.

FIG. 2 shows specific details of the electropneumatic transducer 2. The electropneumatic transducer 2 has a torque motor 16 comprising a coil 18 through which extends a balancer beam 22 supported centrally by a pivot 20. A feedback coil spring 24 is attached at one end to one end of the balancer beam 22. The other end of the feedback coil spring 24 is attached to a feedback lever 26 pivotally supported at one end and pressed at its intermediate portion by a feedback bellows 28. The other end of the balancer beam 22 is positioned closely to a nozzle 34 which is supplied with air under given pressure from an air pressure source 30 through a fixed restriction 32. The output air pressure from the nozzle 34 is led to a pilot valve 36 which generates an output air pressure that is regulated by air branched from the air pressure source 30. The output air pressure from the pilot valve 36 is branched to the feedback bellows 28. The torque motor 16 has a magnet 38 disposed around the coil 18 connected to conductors 40 through which an electric input signal is supplied to the coil 18.

When the intput electric signal supplied via the conductors 40 varies, such a signal change causes a change in the electric current flowing through the coil 18, which then causes a change in the magnetic flux generated thereby. The magnetic force acting on the balancer beam 22 is then varied to cause the balancer beam 22 supported on the pivot 20 to turn, thereby varying the distance between the nozzle 34 and the corresponding end of the balancer beam 22. Therefore, the back pressure of the nozzle 34 is also changed. The nozzle back pressure is amplified by the pilot valve 36 into an output air pressure. Part of the output air pressure from the pilot valve 36 is applied to the feedback bellows 28 to push the feedback lever 26. The feedback lever 26 is thus angularly displaced to pull the feedback spring 24, which then angularly displaces the balancer beam 22 to change the nozzle back pressure again. Specifically, the spring 24 acts to cancel out the force tending to displace the balancer beam 22 in response to the electric input signal applied to the coil 18. The balancer beam 22 is brought into equilibrium or a state of balance when the force produced on the balancer beam 22 in response to the electric input signal is equal to the force produced on the balancer beam 22 by the feedback bellows 28. Therefore, the output air pressure can be produced from the pilot valve 36 always in proportion to the electric input signal applied.

It can be understood from the above description that the conventional regulator is basically composed of a mechanism for converting an electric input signal to an air pressure and a mechanism for regulating a fluid pressure in proportion to the converted air pressure. Where a nozzle flapper mechanism is utilized, it is generally possible to construct the electropneumatic transducer with high accuracy since the nozzle back pressure can be regulated highly accurately. However, it would be difficult to incorporate a nozzle flapper mechanism in the pressure converter coupled to the highly accurate electropneumatic transducer because a gas such as of oxygen could not be discharged as an output pressure to atmosphere. Accordingly, it has been customary to use, in combination, a highly accurate electropneumatic transducer and a pressure converter which is not so accurate. The prior fluid regulator is therefore disadvantageous in that its accuracy cannot be increased to a desired level.

SUMMARY OF THE INVENTION

In view of the aforesaid drawback of the conventional fluid regulator, it is an object of the present invention to provide a fluid regulator which is simple in structure and inexpensive to manufacture, the fluid regulator having, in a housing, a nozzle flapper mechanism, a diaphragm displaceable by the nozzle back pressure of the nozzle flapper mechanism, and a valve body for controlling fluid communication through a fluid passage in accordance with displacement of the diaphragm, the nozzle flapper mechanism being actuatable by an electric input signal to vary the nozzle back pressure for thereby directly controlling the valve body to control a fluid from the fluid passage.

Another object of the present invention is to provide a fluid regulator for regulating a fluid pressure in response to an electric signal, comprising a housing, a nozzle flapper mechanism disposed in the housing and having a nozzle and a nozzle back pressure chamber communicating therewith, the nozzle flapper mechanism being responsive to an electric input signal for producing a change in nozzle back pressure in the nozzle back pressure chamber, a valve body movably disposed in the housing for controlling fluid communication through a passage defined in the housing between a supply port and an outlet port in response to the change in nozzle back pressure, the nozzle back pressure chamber being supplied with a first fluid different from a second fluid in the passage, a sensor disposed in the housing for converting an output fluid pressure signal picked up from the outlet port to an electric feedback signal, and a controller for controlling the nozzle flapper mechanism so as to eliminate the difference between the electric input signal and the electric feedback signal.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
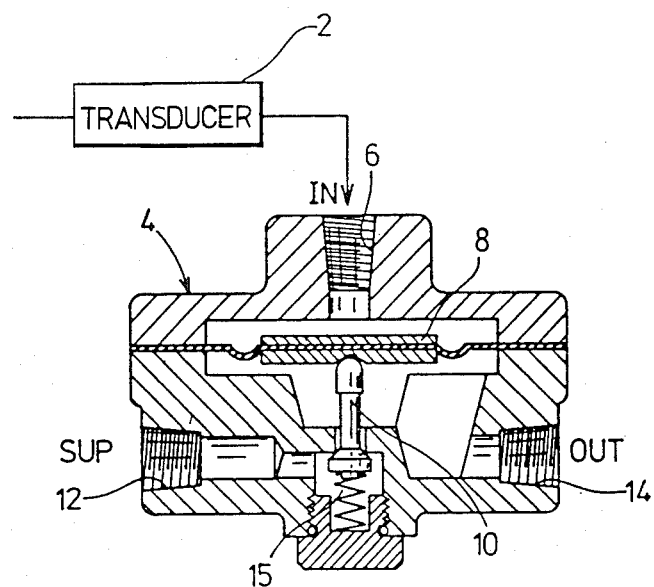
FIG. 1 is a schematic cross-sectional view of a conventional fluid regulator.
Figure 2:
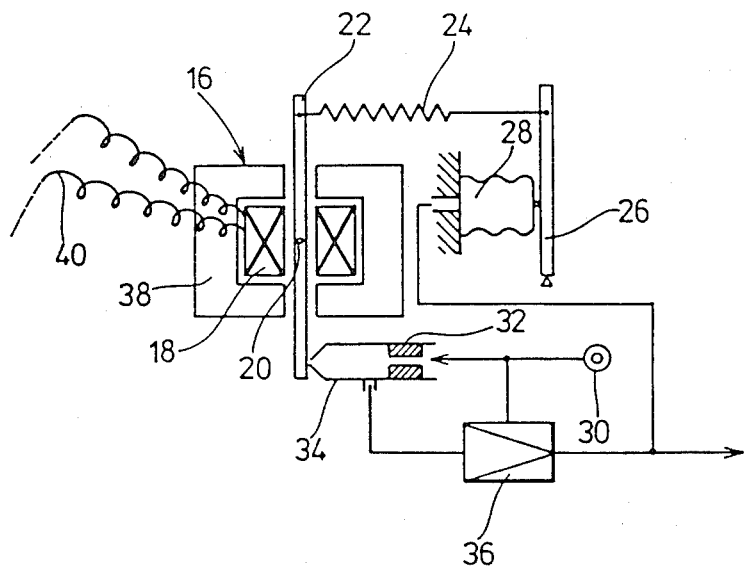
FIG. 2, is a schematic view of an electropneumatic transducer of the fluid regulator shown in FIG. 1.
Figure 3:
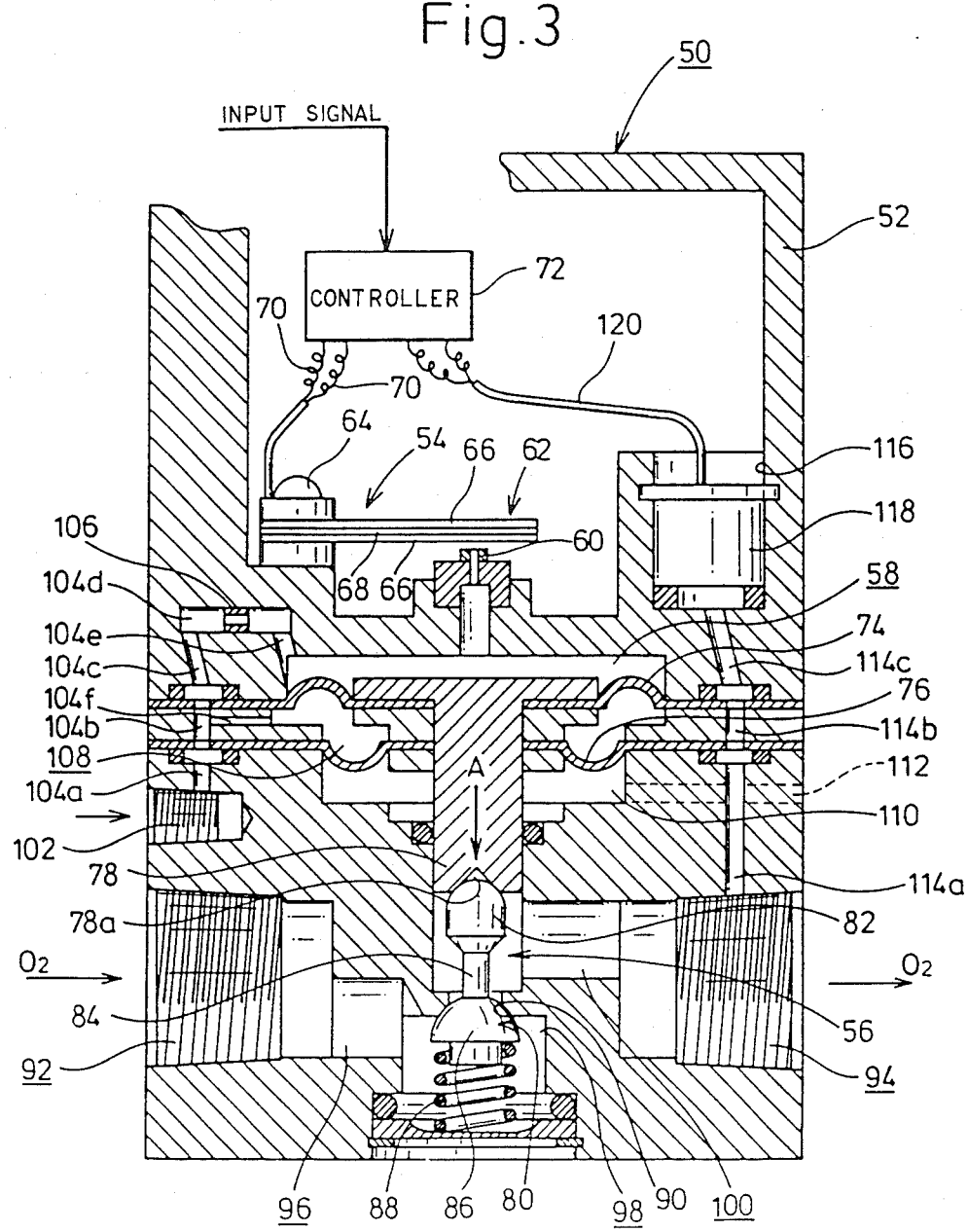
FIG. 3 is a cross-sectional view of a fluid regulator according to the present invention.

FIG. 3 illustrates a fluid regulator, generally designated at 50, according to the present invention. The fluid regulator 50 generally comprises a housing 52, a nozzle flapper mechanism 54 disposed in an upper portion of the housing 52, and a pilot valve assembly 56 disposed in a lower portion of the housing 52.

The nozzle flapper mechanism 54 is composed of a nozzle 60 having a prescribed orifice diameter and communicating with a nozzle back pressure chamber 58 of the pilot valve assembly 56, and a flat flapper 62. The flapper 62 has one end as a free end positioned at a given distance from the nozzle 60. The other end of the flapper 62 is fixed to the housing 52 by a screw 64. The flapper 62 comprises a flat electrostrictive element composed of two piezoelectric ceramic layers 66, 66 having electrodes and an electrode layer 68 sandwiched between the piezoelectric ceramic layers 66, 66. A prescribed voltage is applied to the flapper 62 by a controller 72 through conductors 70, 70 connected to the piezoelectric ceramic layers 66, 66. The pilot valve assembly 56 comprises two vertially spaced, juxtaposed diaphragms 74, 76, a piston 78 holding the diaphragms 74, 76 in spaced relation at substantially central portions thereof, and a valve body 80 engaging in a conical recess 78a defined in the lower end of the piston 78. The diaphragm 74 has a larger pressure-bearing area and the diaphragm 76 has a smaller pressure-bearing area. The valve body 80 is basically comprised of a semispherical projection 82 seated in the conical recess 78a, a rod 84 extending downwardly from the semispherical projection 82, and a semispherical inner valve 86 fixed to the lower distal end of the rod 84. The valve body 80 is normally urged by a coil spring 88 held against the inner valve 86 to press the projection 82 into the recess 78a of the piston 78. Under normal condition, therefore, the upper semispherical side of the inner valve 86 is seated on a valve seat 90 defined in the housing 52 to shut off fluid communication provided by passages 96, 98, 100 between a supply port 92 and an outlet port 94 which are defined in the housing 52.

The housing 52 also has a port 102 defined above the supply port 92 out of communication therewith for introducing air supplied. The port 102 is held in communication with the nozzle back pressure chamber 58 through passages 104a, 104b, 104c, 104d, 104e. The passage 104d has an orifice 106 therein for introducing air under pressure at a constant rate at all times into the nozzle back pressure chamber 58. From the passage 104b, there is branched a passage 104f communicating with a supply pressure chamber 108 defined between the diaphragms 74, 76. The nozzle back pressure chamber 58 is larger in volume than the supply pressure chamber 108. The diaphragm 76 and the housing 52 define therebetween an atmospheric pressure chamber 110 vented to atmosphere through a passage 112. Passages 114a, 114b, 114c extend in mutual communication from the outlet port 94, the passages 114a, 114b, 114c being held out of communication with the atmospheric pressure chamber 110 and connected to a cavity 116 defined in the housing 52. A pressure sensor 118 is fixedly mounted in the cavity 116, the pressure sensor 118 having a semiconductor diaphragm (not shown) therein. A displacement of the semiconductor diaphragm is picked up as a voltage change which is applied through conductors 120 to the controller 72. Specifically, when a fluid pressure output is applied via the passages 114a, 114b 114c to the pressure sensor 118, the semiconductor diaphragm is displaced to change its own electric resistance such that the fluid pressure output can be detected as an electric signal.

Operation of the fluid regulator thus constructed will be described below.

It is assumed that an oxygen gas which will not be released to atmosphere is supplied to the supply port 92 and the oxygen gas as regulated in pressure by the valve body 80 is produced from the outlet port 94. When an electric input signal is impressed to the controller 72, the controller 72 applied a prescribed voltage to the nozzle flapper mechanism 54 through the conductors 70. Dependent on the polarity of the voltage applied by the controller 70, the piezoelectric ceramic layers 66, 66 are caused to change the distance between themselves and the orifice of the nozzle 60. As a result, the nozzle back pressure in the nozzle back pressure chamber 58 suppiled with air is varied through the nozzle 60. For example, if the nozzle back pressure in the nozzle back pressure chamber 58 is increased, the piston 78 is lowered as indicated by the arrow A to move the semispherical projection 82 downwardly at the recess 78a, thereby lowering the valve body 80 against the resiliency of the coil spring 88. The inner valve 86 is now unseated downwardly off the valve seat 90 to provide communication from the supply port 92 through the passages 96, 98, 100, whereupon the oxygen gas introduced from the supply port 92 is led out of the outlet port 94.

The oxygen gas discharged under a given pressure from the outlet port 94 is also guided through the passages 114a, 114b, 114c into the cavity 116 in which the introduced oxygen gas presses the semiconductor diaphragm of the pressure sensor 118. The semiconductor diaphragm now generates a voltage signal corresponding to the applied pressure of the oxygen gas and supplies the voltage signal over the conductors 120 to the controller 72. Therefore, the output pressure signal is fed back to the controller 72. The controller 72 compares the voltage signal thus fed back with the electric input signal, and, if there is any difference, applies a differential voltage signal to the nozzle flapper mechanism 54 in order to eliminate such a signal difference. The controller 72 therefore effects feedback control at all times through comparison between the electric input signal and the output pressure signal which is fed back. When there is no difference between the electric input signal and the output pressure signal, the nozzle body 56 is brought into equilibrium or a state of balance. When such equilibrium is reached, the oxygen gas pressure proportional to the electric input signal is produced from the outlet port 94.

With the arrangement of the present invention, the output oxygen gas pressure is fed back to the highly accurate electropneumatic transducer sensor utilizing the nozzle flapper mechanism. As a consequence, the output oxygen gas pressure can be controlled with high accuracy. The fluid regulator is simple in construction. Since the electrostrictive element is employed for controlling the nozzle back pressure, the fluid regulator can easily be controlled electrically, can be reduced in size, and is highly resistant to mechanical fatigue arising from repetitive use. Therefore, the fluid regulator has a prolonged service life. In the illustrated embodiment, the oxygen gas has been described as the fluid to be supplied from the supply port to the outlet port. However, the pressure of not only a gas but also a liquid can be controlled as it is delivered from the supply port to the outlet port through the valve body since the fluid passageway from the supply port to the outlet port is isolated from the fluid passageway associated with the nozzle flapper mechanism.

Although a certain preferred embodiment has been shown and described, it should be understood that many changes and modifications may be made therein without departing from the scope of the appended claims.

What is claimed is:

1. A fluid regulator for regulating a fluid pressure in response to an electric signal, comprising:
   a housing;
   a nozzle flapper mechanism disposed in said housing and having a nozzle and a nozzle back pressure chamber communicating therewith, said nozzle flapper mechanism being responsive to an electric input signal for producing a change in nozzle back pressure in said nozzle back pressure chamber, said nozzle back pressure chamber having diaphragm means displacable in response to said change in nozzle back pressure;
   a valve body movably disposed in said housing for controlling fluid communication through a passage defined in said housing between a supply port and an outlet port in response to said change in nozzle back pressure, said nozzle back pressure chamber being supplied with a first fluid different from a second fluid in said passage, said valve body including a piston mounted on said diaphragm means and a valve fixed to said piston for controlling the fluid communication through said passage;
   a sensor disposed in said housing for converting an output fluid pressure signal picked up from said outlet port to an electric feedback signal; and
   a controller for controlling said nozzle flapper mechanism so as to eliminate the difference between said electric input signal and said electric feedback signal.

2. A fluid regulator according to claim 1, wherein said diaphragm means comprises two diaphgram having different pressure-bearing areas, the diaphgram of a larger pressure-bearing area being opposite to said nozzle, and the diaphragm of a smaller pressure-bearing area having one surface exposed to atmospheric pressure.

3. A fluid regulator according to claim 1, wherein said first fluid is air.

4. A fluid regulator according to claim 1, wherein said nozzle flapper mechanism comprises a flat electrostrictive element.

* * * * *